(12) United States Patent
Shirakihara et al.

(10) Patent No.: US 6,185,702 B1
(45) Date of Patent: Feb. 6, 2001

(54) METHOD AND SYSTEM FOR PROCESS STATE MANAGEMENT USING CHECKPOINTS

(75) Inventors: Toshio Shirakihara; Hideaki Hirayama; Kiyoko Sato; Tatsunori Kanai, all of Kanagawa (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/012,463

(22) Filed: Jan. 23, 1998

(30) Foreign Application Priority Data

Jan. 24, 1997 (JP) .................................... 9-010960

(51) Int. Cl.⁷ ..................................................... G06F 11/10
(52) U.S. Cl. ................................................. 714/38; 714/15
(58) Field of Search ......................................... 714/38, 15

(56) References Cited

U.S. PATENT DOCUMENTS

| | | | |
|---|---|---|---|
| 5,301,309 | * 4/1994 | Sugano ................................. | 395/575 |
| 5,590,277 | * 12/1996 | Fuchs et al. ..................... | 395/183.14 |
| 5,621,885 | * 4/1997 | Del Vigna, Jr. ................. | 395/182.11 |
| 5,715,386 | * 2/1998 | Fulton, III et al. ............. | 395/183.14 |
| 5,802,267 | * 9/1998 | Shirakihara et al. ........... | 395/182.13 |
| 5,828,821 | * 10/1998 | Hoshina et al. ................ | 395/182.13 |
| 5,832,201 | * 11/1998 | Hirayama et al. .............. | 395/182.11 |
| 5,845,082 | * 12/1998 | Murakami ....................... | 395/200.56 |
| 5,845,292 | * 12/1998 | Bohannon et al. .................. | 707/202 |
| 5,907,673 | * 5/1999 | Hirayama et al. .............. | 395/182.14 |
| 5,922,078 | * 7/1999 | Hirayama et al. ...................... | 714/16 |
| 5,923,832 | * 7/1999 | Shirakihara et al. ........... | 395/182.13 |

OTHER PUBLICATIONS

K. Mani Chandy, et al., "Distributed Snapshots: Determining Global States of Distributed Systems," ACM Transactions on Computer Systems, vol. 3, No. 1, (1985), pp. 63–75.

* cited by examiner

Primary Examiner—David A. Wiley
(74) Attorney, Agent, or Firm—Oblon, Spivak, McClelland, Maier & Neustadt, P.C.

(57) ABSTRACT

A process state management scheme capable of acquiring process states consistently even in a case where a new process is generated from some process, while using the synchronous checkpointing method. This scheme prohibits a new process generation during a process state acquisition, which can be realized by judging whether a process generation request by a first process for generating a second process is prior to a process state acquisition request or not, and generating the second process from the first process accordingly. This scheme also prohibits a process state acquisition during a new process generation, which can be realized by acquiring a process state at each of the first and second processes after a notice of the identifier of the second process from the first process is received, when a notice of the identifier of the second process from the second process is prior to the notice from the first process.

10 Claims, 14 Drawing Sheets

FIG. 7

| GROUP ID | PROCESS | fork INFO | | CP FLAG |
|---|---|---|---|---|
| | | PARENT PROCESS ID (731) | CHILD PROCESS ID (732) | |
| 1 | J B E | E | B | 0 |
| 2 | A I | 0 | 0 | 0 |
| 3 | G C F | 0 | 0 | 1 |
| ... | | | | |
| n | H D | 0 | 0 | 0 |

US 6,185,702 B1

METHOD AND SYSTEM FOR PROCESS STATE MANAGEMENT USING CHECKPOINTS

BACKGROUND OF THE INVENTION

1. Field of the Invention

The present invention relates to a process state management method and a process state management system, and more particularly to a method and a system for managing process states using checkpoints in cases where one process is generated from another process.

2. Description of the Background Art

Conventionally, as a method for improving a reliability of program execution in a computer, the program execution method according to checkpoints has been known. This is a method in which states of processes that are executing entities of a program are acquired either regularly or irregularly according to prescribed checkpoint timings at a time of execution of the program, and the program is re-executed from the process states acquired at the nearest checkpoint when a trouble occurs during the program execution. Here, the checkpoint is defined as a time for carrying out the processing to acquire the process states when the program execution is viewed in a time sequence, and the checkpoint timing is defined as a time range from one checkpoint to a next checkpoint.

Now, in a system in which one process operates independently, it is sufficient to acquire the process states only at the checkpoints for intermediate states of that process, but in a case where a plurality of processes operate in relation such as that of inter-process communications, it is insufficient to acquire the process states for a single process alone according to the checkpoints. Namely, in order to prevent an occurrence of contradiction at a time of re-execution, there is a need to acquire process states for a plurality of processes which are mutually related at each checkpoint. In the following, for the sake of convenience, a checkpoint for each process is referred to as a local checkpoint, and a set of local checkpoints for mutually related processes is referred to as a distributed checkpoint.

As described, In a case where a plurality of processes operate in relation such as that of inter-process communications, it is necessary to acquire the process states of these plurality of mutually related processes consistently (without contradiction). This point will now be illustrated in further detail by referring to FIGS. 1A, 1B and 1C.

Namely, FIGS. 1A, 1B and 1C show examples of a distributed checkpoint. More specifically, FIGS. 1A, 1B and 1C show three types of distributed checkpoints CH1, CH2, and CH3 in a case where a processing is carried out while each one of three processes p1, p2 and p3 carries out the message passing. In FIGS. 1A, 1B, and 1C, a symbol m indicates a message, and two numerals suffixed to this symbol m indicate a message transmission side process number and a message reception side process number respectively.

In FIG. 1A, at the distributed checkpoint CH1, there is no contradicting states for each message when the process states are acquired according to local checkpoints ch11, ch12 and ch13, so that the message passing can be carried out correctly even when the processing is restarted by rolling back to the nearest checkpoint. However, in FIG. 1B, for a message m32 at the distributed checkpoint CH2, despite of the fact that the process p3 is still in a state of not transmitting this message at the local checkpoint ch13, the process p2 is in a state of already receiving this message at the local checkpoint ch12. For this reason, when a trouble occurs in any one process and the processing is to be restarted by rolling back to the distributed checkpoint CH1, contradicting states regarding a message m32 arise. Similarly, for the distributed checkpoint CH3 of FIG. 1C, contradicting states regarding a message m23 arise.

The conventionally proposed methods for guaranteeing the consistency of distributed checkpoints deal with the message passing, and include a synchronous checkpointing method and an asynchronous checkpointing method.

As a scheme for acquiring process states according to synchronous checkpointing, there is a scheme disclosed in K. Mani Chandy and L. Lamport: "Distributed Snapshots: Determining Global States of Distributed Systems", ACM Trans. of Computer Systems, Vol. 3, No. 1, pp. 63–75 (February 1985). This scheme deals with the message passing as the inter-process communication, similarly as the examples described above, and defines the consistent distributed checkpoint as "a state without a message which is not yet transmitted and already received". Here, a state without a message which is not yet transmitted and already received is a state where a message m23 exists in a case of FIG. 1B described above.

Also, at CH3, m23 will be lost so that such a message which is already transmitted and not yet received will be stored as acquired information. As a specific algorithm for this, process states are stored in such a manner that messages that cause contradictions are detected by exchanging messages called markers at a time of storing process states according to distributed checkpoints, and these messages are stored so as to be able to construct consistent states as a whole.

Also, in the general operating system, at a time of generating a new process, there are cases where a currently operating process newly generates its own copy. For example, in UNIX, the fork system call corresponds to this function by which a process with the same content as a process that called up this fork system call is generated. Here, a process that called up this fork system call is called a parent process, and a process newly generated from the parent process is called a child process.

FIG. 2 shows an exemplary checkpoint in a case of generating a new process in the synchronous checkpointing. In FIG. 2, a process A generates distributed checkpoints CP(n) and CP(n+1), and between these, the process A also generates a process B by using the fork system call. At this point, at CP(n+1), the process A is unrelated to the process B so that no checkpoint is generated for the process B. However, afterwards, the processes A and B come to have a relationship through messages m1 and m2. Then, when a trouble (fault) F1 occurs later on, the process A is going to be rolled back to CP(n+1) and restarted from there on, but the process B has no corresponding check point so that the process state has not been acquired for the process B and therefore it is impossible to restart the process B correctly.

Thus, in the synchronous checkpointing method for distributed checkpoints that deal with a plurality of processes, it is impossible to acquire process states consistently in a case where a new process is generated from some process, and for this reason, it is impossible to restart a newly generated process correctly in a case where a trouble occurs during the program execution and the restart is required.

SUMMARY OF THE INVENTION

It is therefore an object of the present invention to provide a method and a system for process state management which are capable of acquiring process states consistently even in a case where a new process is generated from some process, while using the synchronous checkpointing method.

According to one aspect of the present invention there is provided a method for managing process states by acquiring process states of a group of processes which are mutually related, comprising the steps of: (a) prohibiting a new process generation during a process state acquisition; and (b) prohibiting a process state acquisition during a new process generation.

According to another aspect of the present invention there is provided a method for managing process states by acquiring process states of a group of processes which are mutually related, comprising the steps of: notifying from a first process an identifier of a second process and notifying from the second process the identifier of the second process, when the second process is generated from the first process; judging whether a notice of the identifier of the second process from the second process is prior to a notice of the identifier of the second process from the first process or not; returning a prescribed response to the notice from the second process after the notice from the first process is received, when the notice from the second process is judged to be prior to the notice from the first process; and commanding process state acquisition to each of the first and second processes according to checkpoints after the prescribed response is returned to the second process.

According to another aspect of the present invention there is provided a method for managing process states by acquiring process states of a group of processes which are mutually related, comprising the steps of: judging whether a process generation request by a first process for generating a second process is prior to a process state acquisition request or not; generating the second process from the first process in response to the process generation request when the process generation request is judged to be prior to the process state acquisition request, or after a process state acquisition in response to the process state acquisition request is completed when the process state acquisition request is judged to be prior to the process generation request; notifying from the first process an identifier of the second process and notifying from the second process the identifier of the second process, when the second process is generated from the first process; and acquiring a process state at each of the first and second processes after a notice of the identifier of the second process from the first process is received, when a notice of the identifier of the second process from the second process is prior to the notice from the first process.

According to another aspect of the present invention there is provided a system for managing process states by acquiring process states of a group of processes which are mutually related, comprising: a first unit for detecting whether a process generation request by a first process for generating a second process is issued or not; a second unit for judging whether another process is being generated by a process mutually related with the first process or not when the process generation request by the first process is detected by the first unit; a third unit for generating the second process from the first process when the another process is judged to be not being generated by the second unit; a fourth unit for notifying from the first process an identifier of the second process, when the second process is generated from the first process by the third unit; a fifth unit for notifying from the second process the identifier of the second process, when the second process is generated from the first process by the third unit; and a sixth unit for acquiring process states of the first and second processes according to a notice of the identifier of the second process from the second process notified by the fifth unit and a notice of the identifier of the second process from the first process notified by the fourth unit.

According to another aspect of the present invention there is provided an article of manufacture, comprising: a computer usable medium having computer readable program code means embodied therein for causing a computer to function as a system for managing process states by acquiring process states of a group of processes which are mutually related, the computer readable program code means includes: first computer readable program code means for causing said computer to detect whether a process generation request by a first process for generating a second process is issued or not; second computer readable program code means for causing said computer to judge whether another process is being generated by a process mutually related with the first process or not when the process generation request by the first process is detected by the first computer readable program code means; third computer readable program code means for causing said computer to generate the second process from the first process when the another process is judged to be not being generated by the second computer readable program code means; fourth computer readable program code means for causing said computer to notify from the first process an identifier of the second process, when the second process is generated from the first process by the third computer readable program code means; fifth computer readable program code means for causing said computer to notify from the second process the identifier of the second process, when the second process is generated from the first process by the third computer readable program code means; and sixth computer readable program code means for causing said computer to acquire process states of the first and second processes according to a notice of the identifier of the second process from the second process notified by the fifth computer readable program code means and a notice of the identifier of the second process from the first process notified by the fourth computer readable program code means.

Other features and advantages of the present invention will become apparent from the following description taken in conjunction with the accompanying drawings.

BRIEF DESCRIPTION OF THE DRAWINGS

FIG. 7 is a diagram illustrating an exemplary configuration of a process management table in the system of FIG. 6.

DETAILED DESCRIPTION OF THE PREFERRED EMBODIMENTS

Referring now to FIG. 3 to FIG. 16, one embodiment of process state management method and system according to the present invention will be described in detail.

Figure 1A:
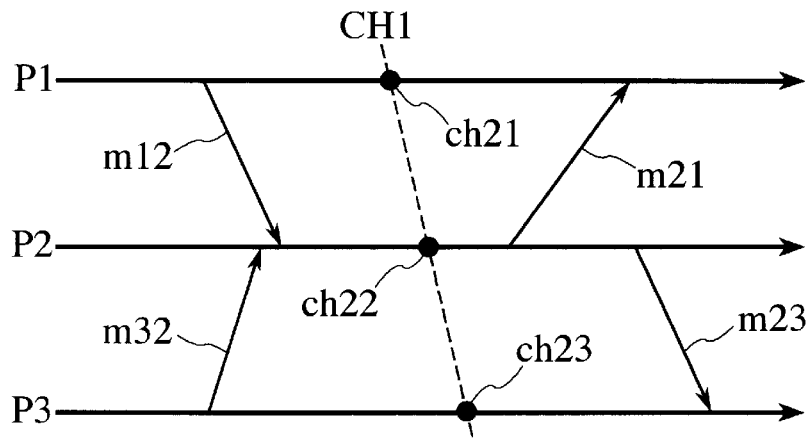
FIGS. 1A, 1B and 1C are diagrams showing examples of distributed checkpoints.
Figure 1B:
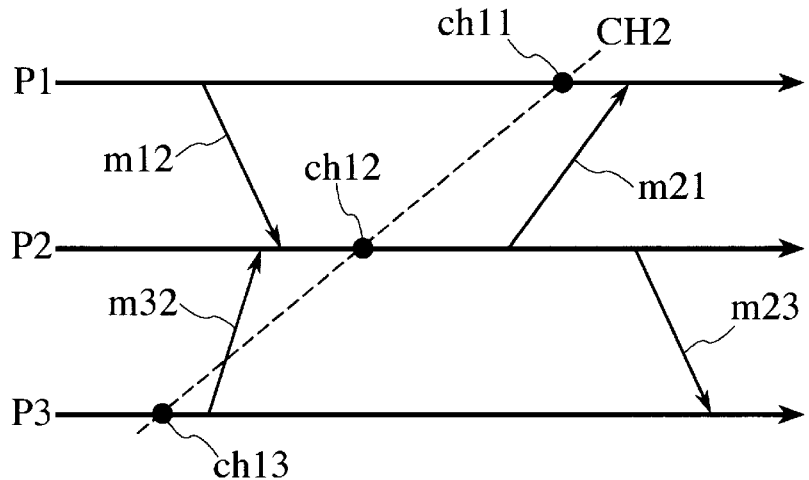
Figure 1C:
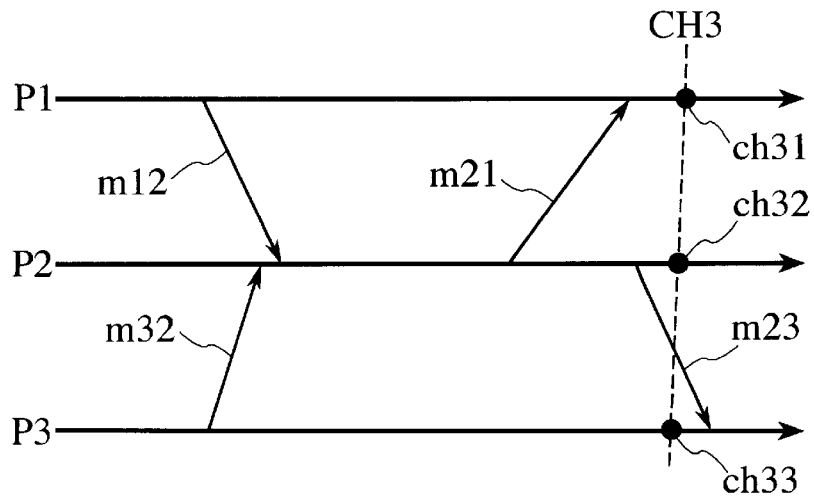
Figure 2:
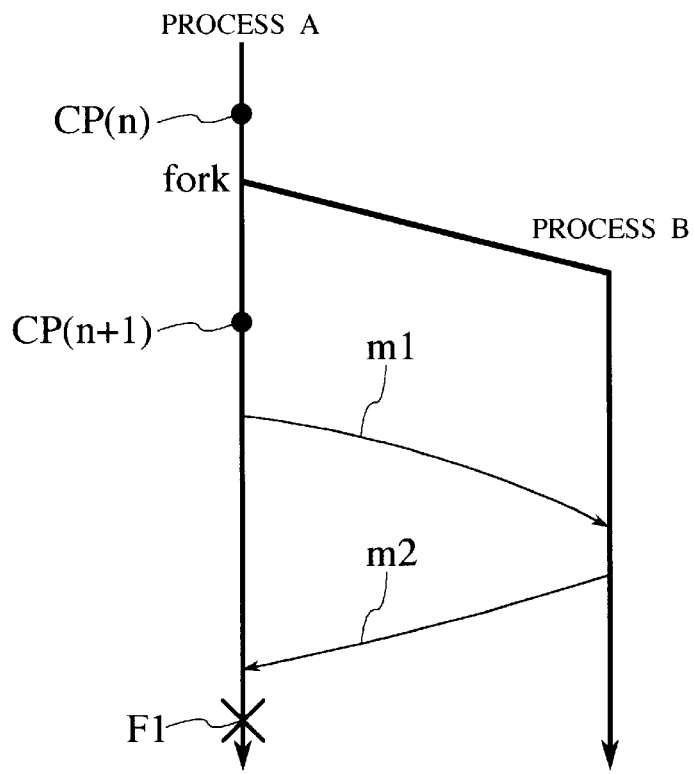
FIG. 2 is a diagram showing an example of a checkpoint in a case of generating a new process while using the synchronous checkpointing.
Figure 3:
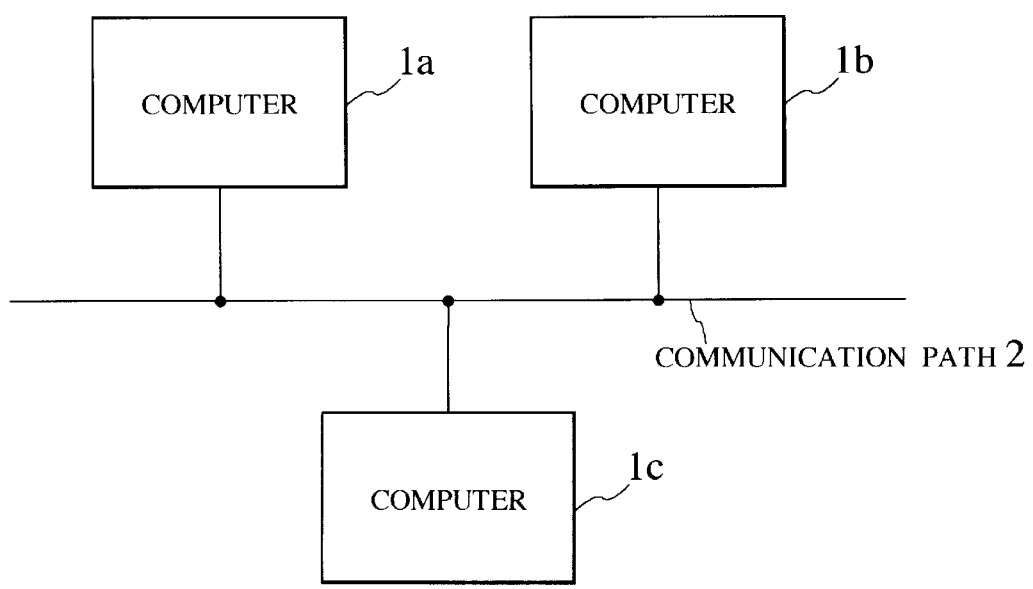
FIG. 3 is a block diagram showing a schematic hardware configuration for realizing the process state management method according to the present invention.

FIG. 3 shows a schematic hardware configuration for realizing a process state management method and system using checkpoints according to the present invention. In this embodiment, executing entities in a case of executing programs on computers will be referred to as processes. In FIG. 3, computers 1a, 1b and 1c generate processes from programs and executes these processes. In addition, computers 1a, 1b and 1c are mutually connected through a communication path 2.

Figure 4A:
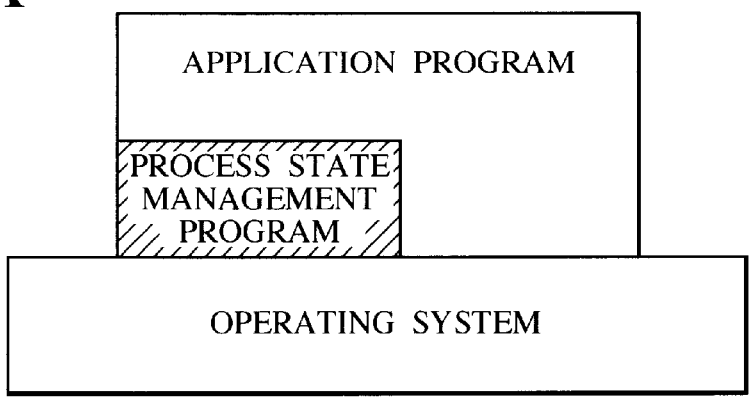
FIGS. 4A and 4B are diagrams conceptually showing a program configuration for realizing the process state management method according to the present invention.
Figure 4B:
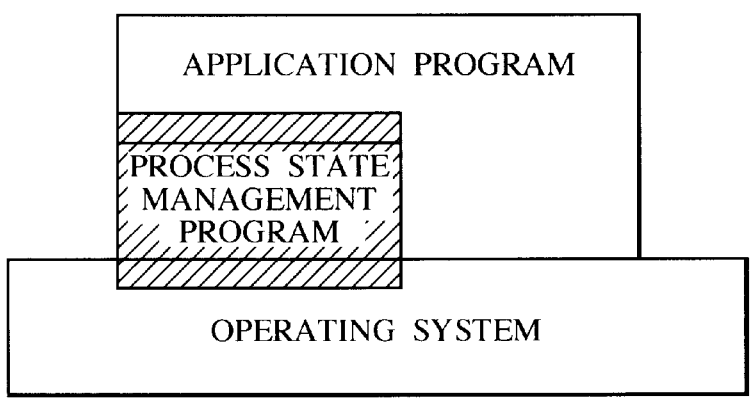

FIGS. 4A and 4B conceptually show program configurations for realizing the process state management method according to the present invention. Namely, the process state management method of the present invention can be realized as a process state management program provided between an application program and operating system as indicated in FIG. 4A, or as a part of an application program or operating system as indicated in FIG. 4B. Note that, although not indicated in FIGS. 4A and 4B, there is no need for this process state management program to be provided independently, and this process state management program may be contained within an application program or operating system, if desired.

Thus the present invention can be realized by computers, and various functions of the present invention described below can be realized by executing programs on computers.

Figure 5:
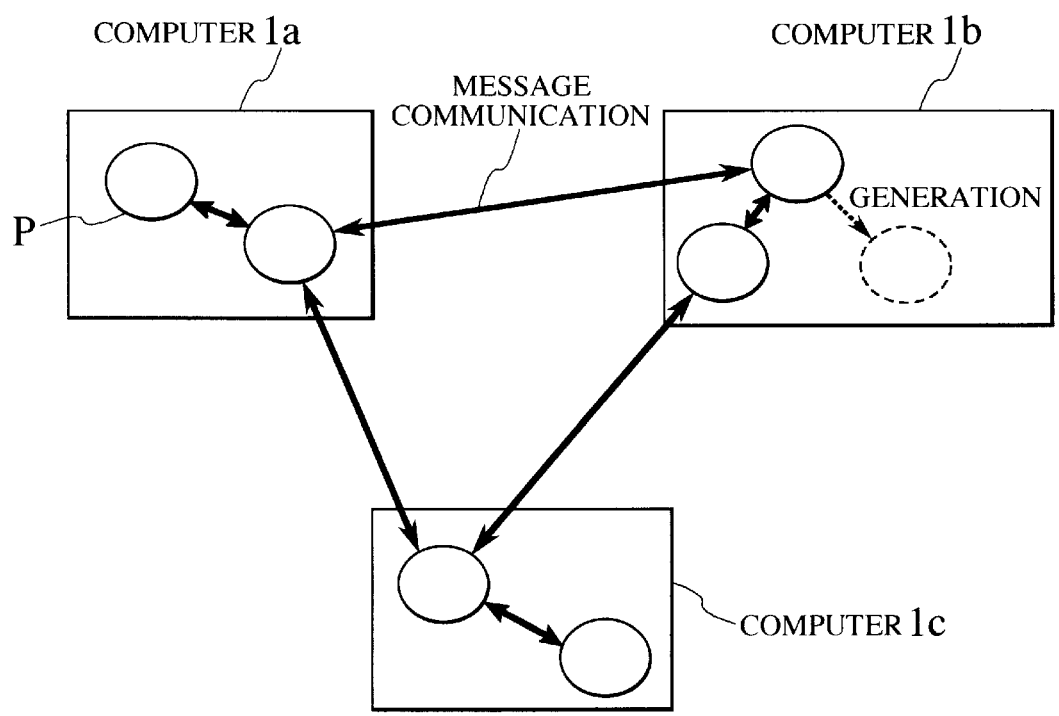
FIG. 5 is a diagram conceptually showing an inter-process communication and a process generation used in the process state management method according to the present invention.

FIG. 5 conceptually shows an inter-process communication and a process generation. In FIG. 5, a process P can be construed as an executing entity of some program on a computer. This process is executed while communicating with another process in one computer, or while processes on two or more computers communicate with each other. Also, a process can newly generate another process. This can be realized by using the fork system call of UNIX, for example. A group of such processes is managed by a process for managing the operating system and processes.

Figure 6:
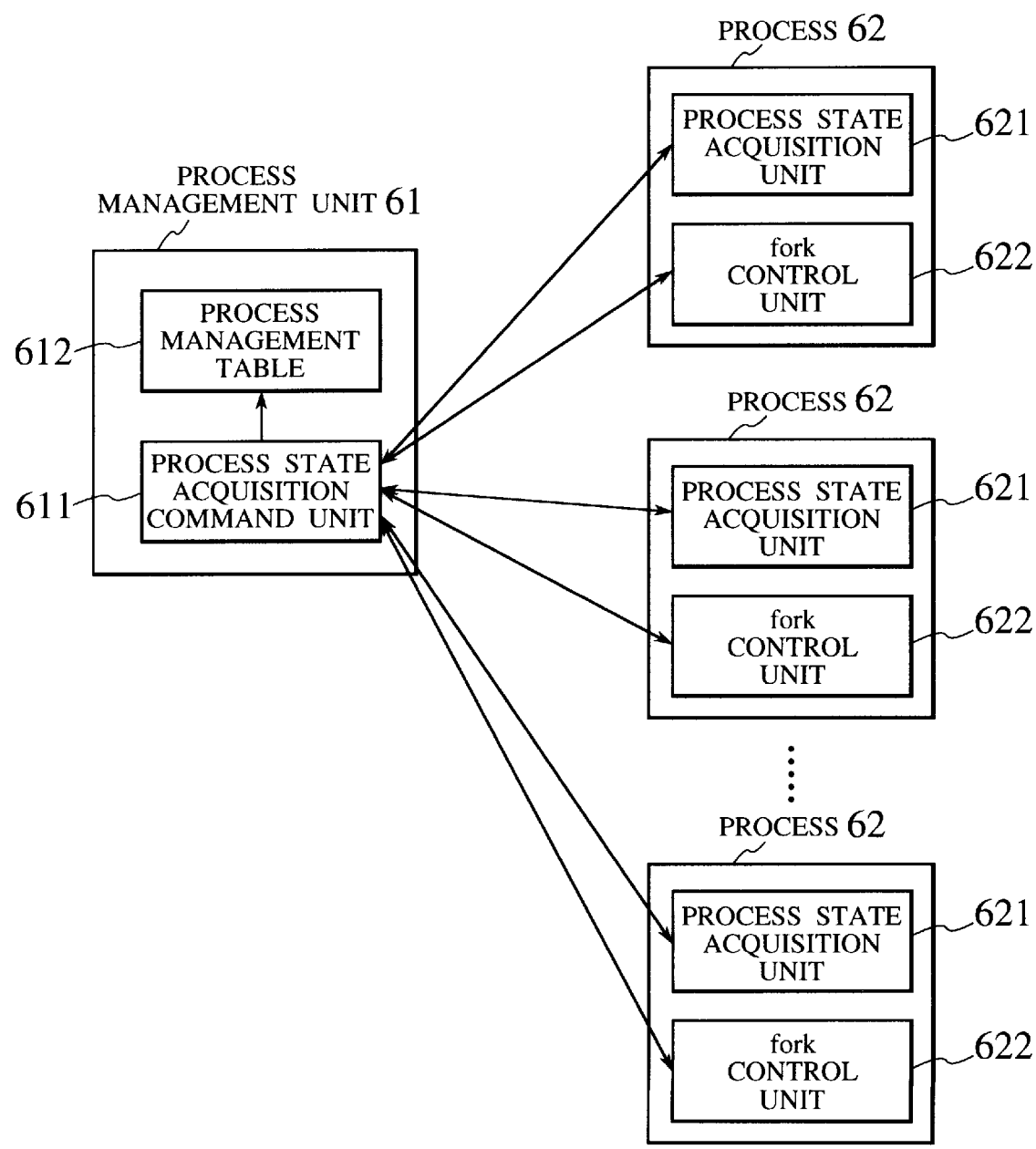
FIG. 6 is a block diagram showing a schematic configuration of a system for realizing the process state management method according to the present invention.

FIG. 6 shows a schematic configuration of a system for realizing the process state management method using checkpoints according to the present invention. In FIG. 6, a process management unit 61 has a process state acquisition command unit 611 for commanding the storing of a process state according to a local checkpoint for each process. In addition, the process management unit 61 has a process management table 612 for managing a group (process group) of processes which are mutually related.

FIG. 7 shows an exemplary configuration of the process management table 612. As shown in FIG. 7, the process management table 612 has a group ID field 71, a process name field 72, a fork information field 73, and a CP flag field 74. The group ID field 71 is for managing mutually related processes by using ID numbers, for example. The process name field 72 registers a process name of a process belonging to some group. The fork information field 73 further has a parent process ID field 731 and a child process ID field 732, which register process IDs of a parent process that carries out the fork processing and a child process generated by that parent process, respectively. The CP flag field 74 registers a value indicating whether the storing of process state according to checkpoint is in progress or not for the processes belonging to each group.

Returning to FIG. 6, each process 62 has a process state acquisition unit 621 for carrying out the storing of a process state according to a local checkpoint, and a fork control unit 622 for carrying out the control for generating new processes.

The process state management method using checkpoint realized by the above configuration can be viewed functionally as follows.

Figure 8:
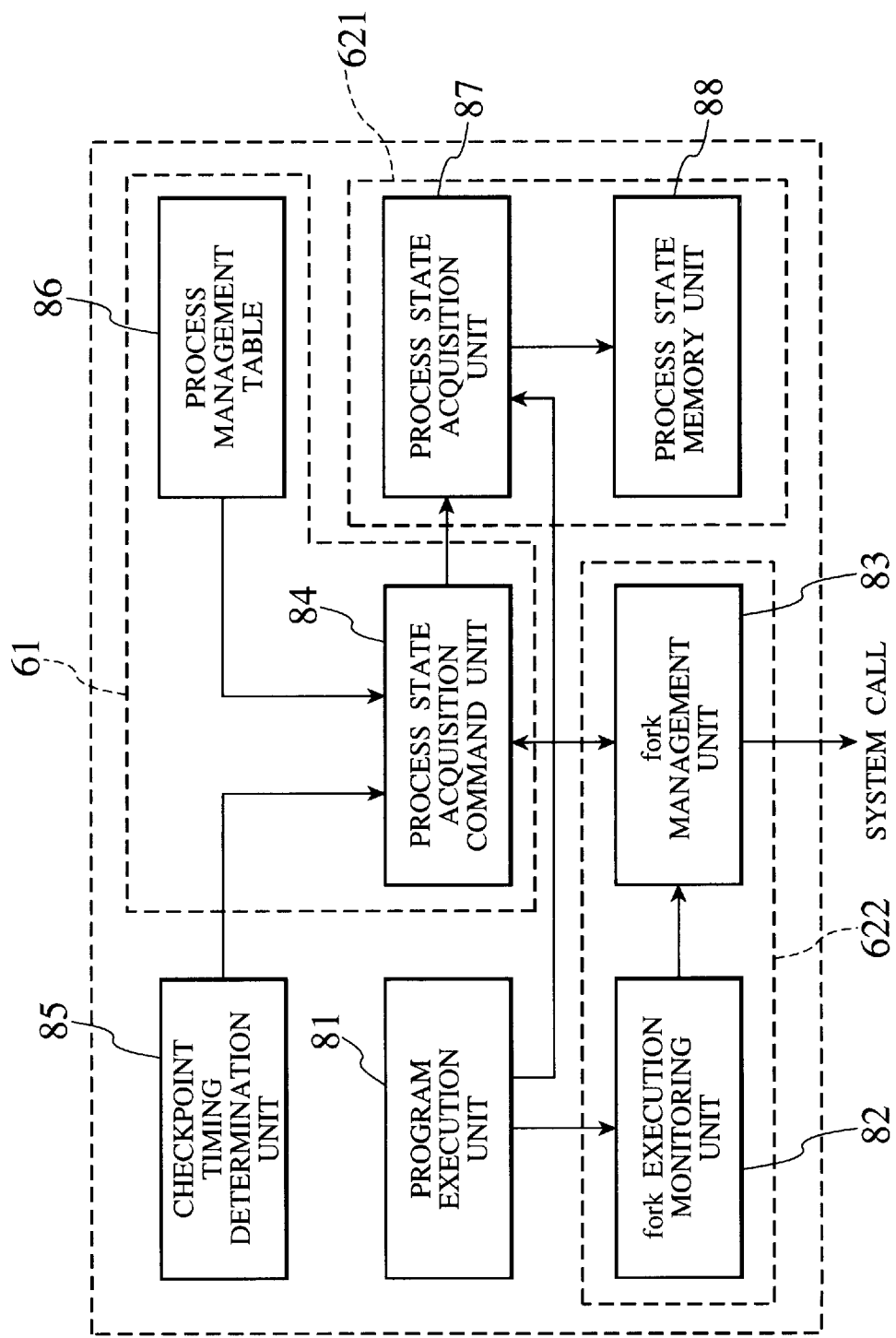
FIG. 8 is a block diagram showing a functional configuration of a system for realizing the process state management method according to the present invention.

Namely, FIG. 8 shows a functional configuration of a system for realizing the process state management method according to the present invention.

In FIG. 8, a program execution unit 81 executes an application program as processes. This program execution unit 81 can be realized by using any suitable program execution format, such as compiler execution, interpreter execution, etc. While the program execution unit 81 executes an application program, a fork execution monitoring unit 82 monitors whether a system call is going to be called up by the fork function or not. When it is detected that the fork system call is going to be called up, this fork execution monitoring unit 82 notifies this fact to a fork management unit 83. Before the fork system call is actually called up, the fork management unit 83 notifies a process ID of a process (parent process) which calls up the fork system call to a process state acquisition command unit 84. Also, after the fork system call is actually called up, the fork management unit 83 of the parent process notifies a process ID of a generated child process to the process state acquisition command unit 84 while the fork management unit 83 of the child process notifies the own process ID to the process state acquisition command unit 84.

A checkpoint timing determination unit 85 is provided for determining a timing (checkpoint timing) for storing a process state of a currently executed process. The checkpoint timing determination unit 85 determines a checkpoint either regularly or irregularly according to a timer managed by another process or the operating system, for example. When it is judged as a checkpoint, the checkpoint timing determination unit 85 notifies this fact to the process state acquisition command unit 84 in order to store the process state.

The process state acquisition command unit 84 commands a process state acquisition unit 87 to store the process state, according to a notice from the fork management unit 83 or a notice from the checkpoint timing determination unit 85, by referring to a process management table 86, and registering appropriate information into the process management table 86 if necessary.

The process state acquisition unit 87 generates a process state for each process and stores it into a process state memory unit 88, according to a command from the process state acquisition command unit 84, by obtaining information from the program execution unit 81 if necessary.

This system of the present invention in the above described configuration operates as follows.

Figure 9:
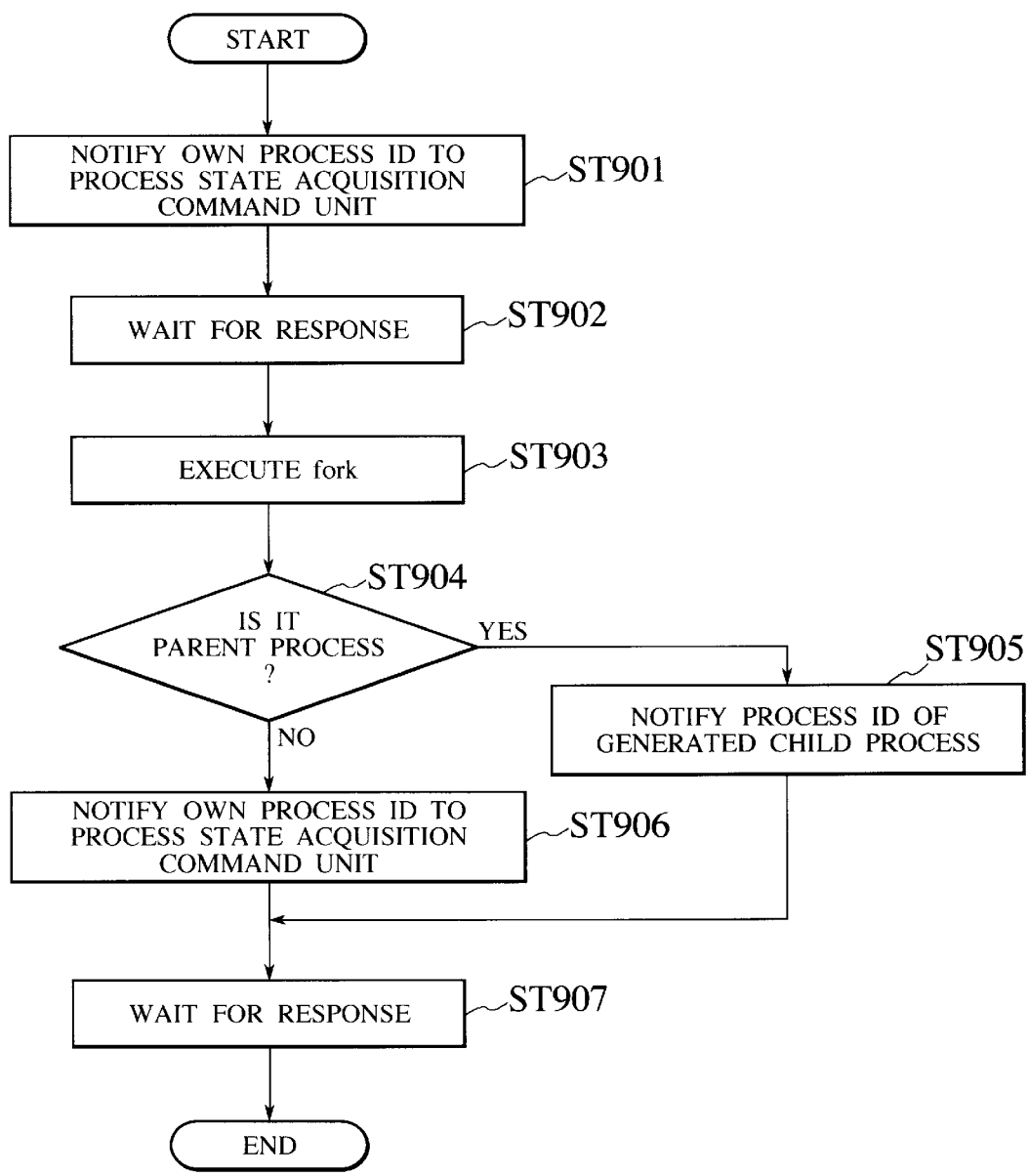
FIG. 9 is a flow chart for the operation of a fork management unit in the system of FIG. 8.

FIG. 9 shows a flow chart for the operation of the fork management unit 83 in the fork control unit 622, which proceeds as follows.

When it is detected that the fork system call is going to be called up, the fork execution monitoring unit 82 of a process (parent process) that newly generates a process notifies this fact to the fork management unit 83. In response, the fork management unit 83 notifies an own process ID to the process state acquisition command unit 84 before the fork system call is actually called up (ST901), and waits for a response from the process state acquisition command unit 84 (ST902). Then, when a response from the process state acquisition command unit 84 is returned by carrying out the operation as described below, the fork management unit 83 executes the fork system call (ST903).

After the fork system call is executed, the fork management unit 83 continues its processing separately for the parent process and the child process (ST904). The fork management unit 83 of the parent process notifies a process ID of the generated child process to the process state acquisition command unit 84 (ST905), and waits for a response from the process state acquisition command unit 84 (ST907). On the other hand, the fork management unit 83 of the child process notifies an own process ID to the process state acquisition command unit 84 (ST906), and waits for a response (ST907). This completes the operation of the fork management unit 83.

Figure 10:
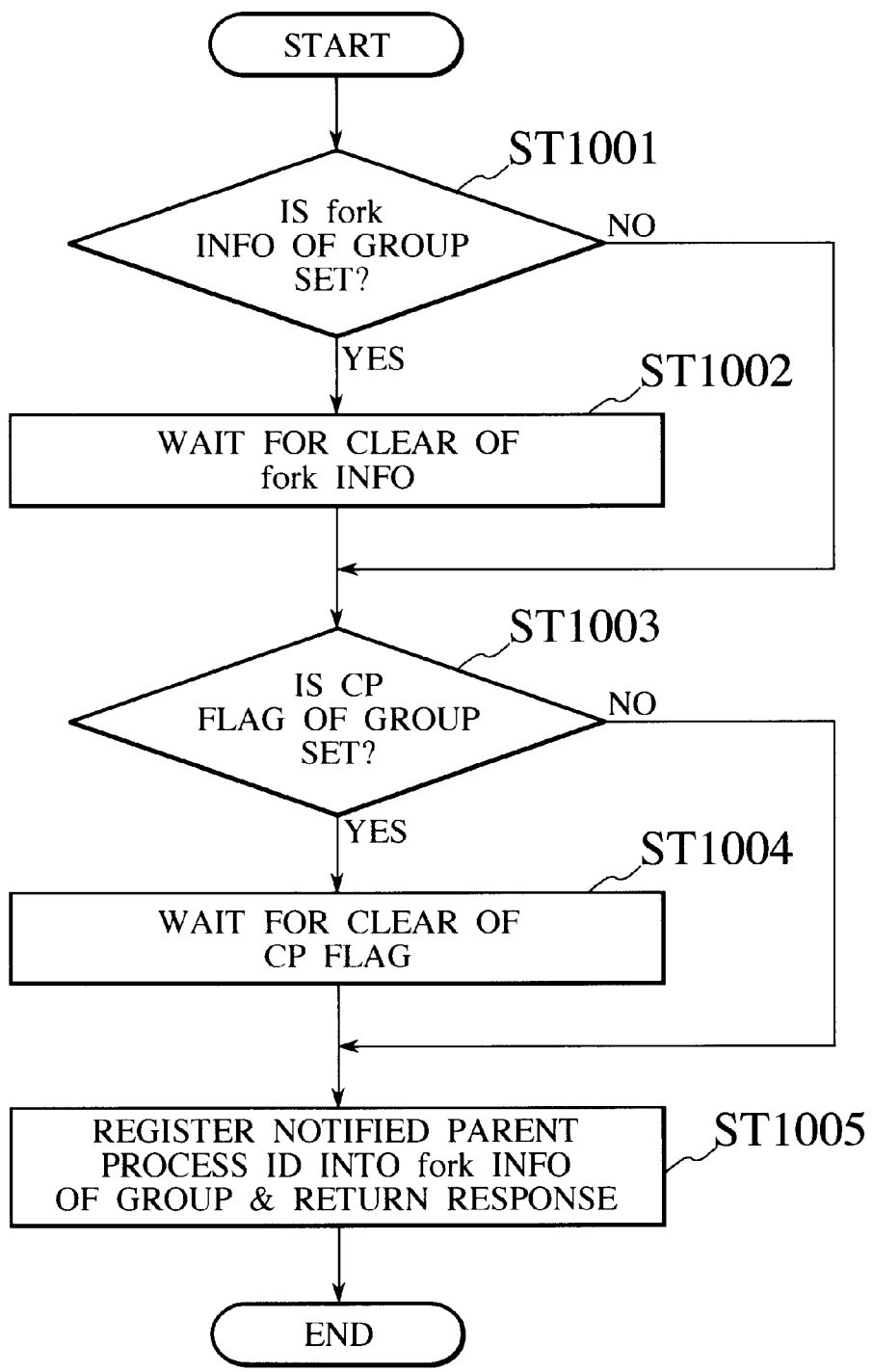
FIG. 10 is a flow chart for the operation of a process state acquisition command unit in the system of FIG. 8 at a time of process generation.

FIG. 10 shows a flow chart for the operation of the process state acquisition command unit 84 at a time of process generation, which proceeds as follows.

As described above, the fork management unit 83 notifies its own process ID to the process state acquisition command unit 84 before the fork system call is actually called up, and waits for a response from the process state acquisition command unit 84. In response, the process state acquisition command unit 84 judges whether appropriate information (process ID) is already registered in the fork information field of the group to which this process belongs or not (ST1001), and when it is judged that such an information is already registered, the process state acquisition command unit 84 waits until the fork information gets cleared (ST1002).

When such an information is not yet registered in the fork information field or when the fork information field is cleared, the process state acquisition command unit 84 checks the CP flag field of the group to which this process belongs and judges whether a CP flag is set there or not (ST1003). When it is judged that the CP flag is set, the process state acquisition command unit 84 waits until the CP flag gets cleared (ST1004). After that, the process state acquisition command unit 84 registers the process ID notified from the fork management unit 83 into the parent process ID field of the fork information for that group and returns a response (ST1005). When it is judged that the CP flag is not set, the process state acquisition command unit 84 registers the notified process ID into the parent process ID field of the fork information for that group and returns a response, without waiting (ST1005).

Figure 11:
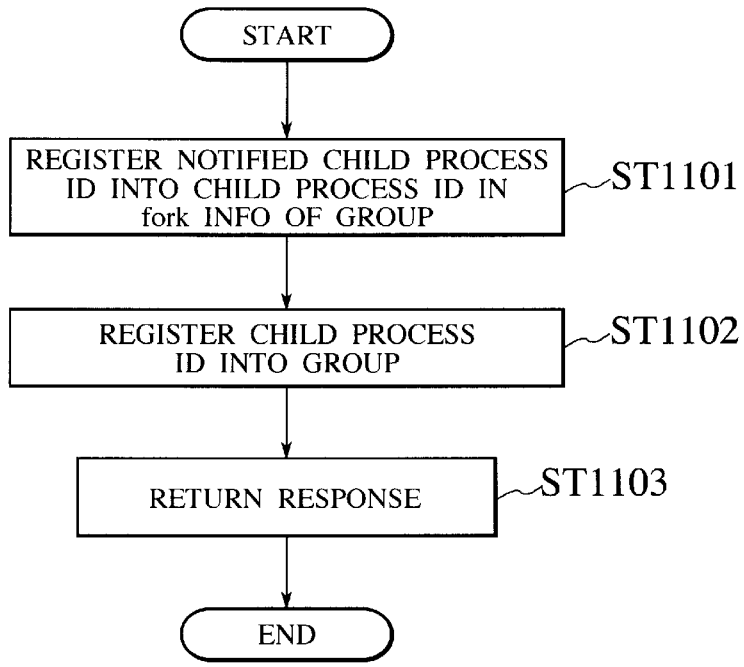
FIG. 11 is a flow chart for the operation of a process state acquisition command unit in the system of FIG. 8 when a process ID of a child process is notified from a fork management unit of a parent process.

FIG. 11 shows a flow chart for the operation of the process state acquisition command unit 84 when the process ID of the child process is notified from the fork management unit 83 of the parent process, which proceeds as follows.

As described above, the fork management unit 83 continues its processing separately for the parent process and the child process after the execution of the fork system call. The fork management unit 83 of the parent process notifies the process ID of the generated child process to the process state acquisition command unit 84 and waits for a response from the process state acquisition command unit 84. In response, the process state acquisition command unit 84 registers the notified process ID into the child process ID field of the fork information for the group to which this process belongs (ST1101), and also registers the process ID of the child process into the process name field for the same group to which the parent process belongs (ST1102), and then returns a response (ST1103).

Figure 12:
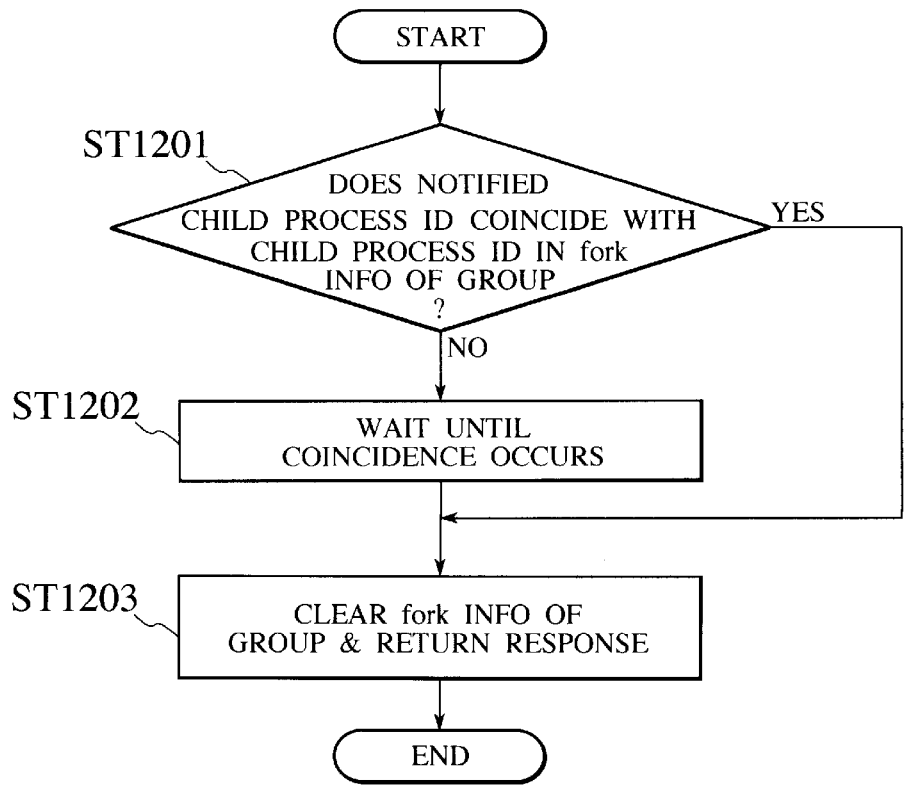
FIG. 12 is a flow chart for the operation of a process state acquisition command unit in the system of FIG. 8 when a process ID of a child process is notified from a fork management unit of the child process.

FIG. 12 shows a flow chart for the operation of the process state acquisition command unit 84 when the process ID of the child process is notified from the fork management unit 83 of the child process, which proceeds as follows.

As described above, the fork management unit 83 of the child process notifies its own process ID to the process state acquisition command unit 84 and waits for a response. In response, the process state acquisition command unit 84 judges whether the notified process ID is already registered in the child process ID field of the fork information for that group or not (ST1201). This is done because there are cases where the child process notifies its own process ID before the parent process notifies the process ID of the child process, due to the indeterminate nature of actions based on parallel processing of processes. When it is judged that the notified process ID is not yet registered, the process state acquisition command unit 84 waits until the field content coincides with the notified process ID, that is, until it is registered (ST1202). When the field content coincides or when it is judged that the notified process ID is already registered, the process state acquisition command unit 84 clears this fork information, and returns a response (ST1203).

Figure 13:
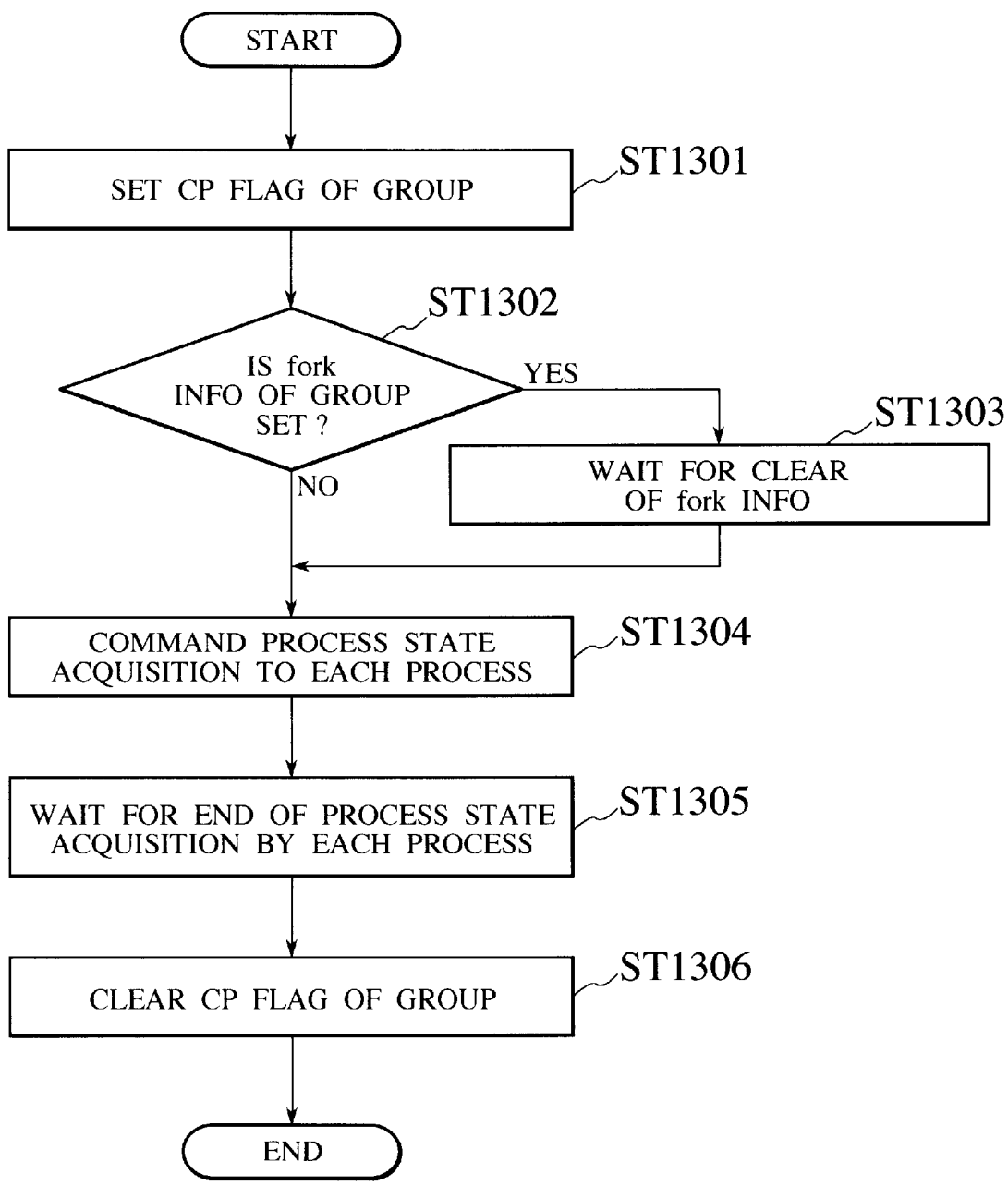
FIG. 13 is a flow chart for the operation of a process state acquisition command unit in the system of FIG. 8 at a time of process state acquisition.
Figure 14:
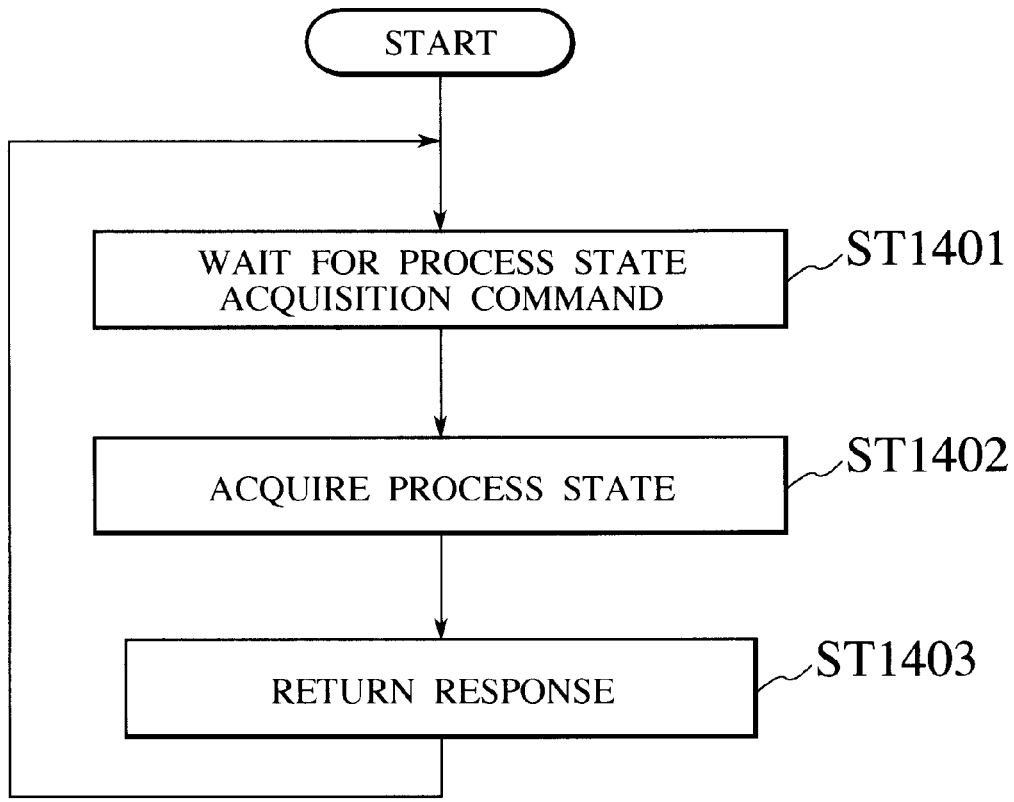
FIG. 14 is a flow chart for the operation of a process state acquisition unit of each process in the system of FIG. 8 at a time of process state acquisition.

FIG. 13 shows a flow chart for the operation of the process state acquisition command unit 84 at a time of process state acquisition and FIG. 14 shows a flow chart for the operation of the process state acquisition unit 87 in the process state acquisition unit 621 of each process at a time of process state acquisition, which proceed as follows.

At a time of acquiring the process state at a checkpoint for some process group, the process state acquisition command unit 84 sets the CP flag for that group (ST1301), and then checks the fork information field of that group to judge whether the fork information is set there or not (ST1302). When it is judged that the fork information is set, the process state acquisition command unit 84 waits until that fork information gets cleared (ST1303). Then, when it is judged that the fork information is not set or when the fork information is cleared, the following process state generation processing at the checkpoint is carried out.

Namely, the process state acquisition command unit 84 commands the acquisition of the process state at the checkpoint to the process state acquisition unit 87 of each process (ST1304), and waits until the acquisition of the process state at the checkpoint by each process is completed (ST1305). The process state acquisition unit 87 of each process waits for the process state acquisition command (ST1401), and upon receiving this process state acquisition command, the process state acquisition unit 87 of each process generates and stores the process state at the checkpoint (ST1402) and returns a response (ST1403). Then, after the acquisition of the process state at the checkpoint is completed by each process, the process state acquisition command unit 84 clears the CP flag of that group (ST1306).

Figure 15A:
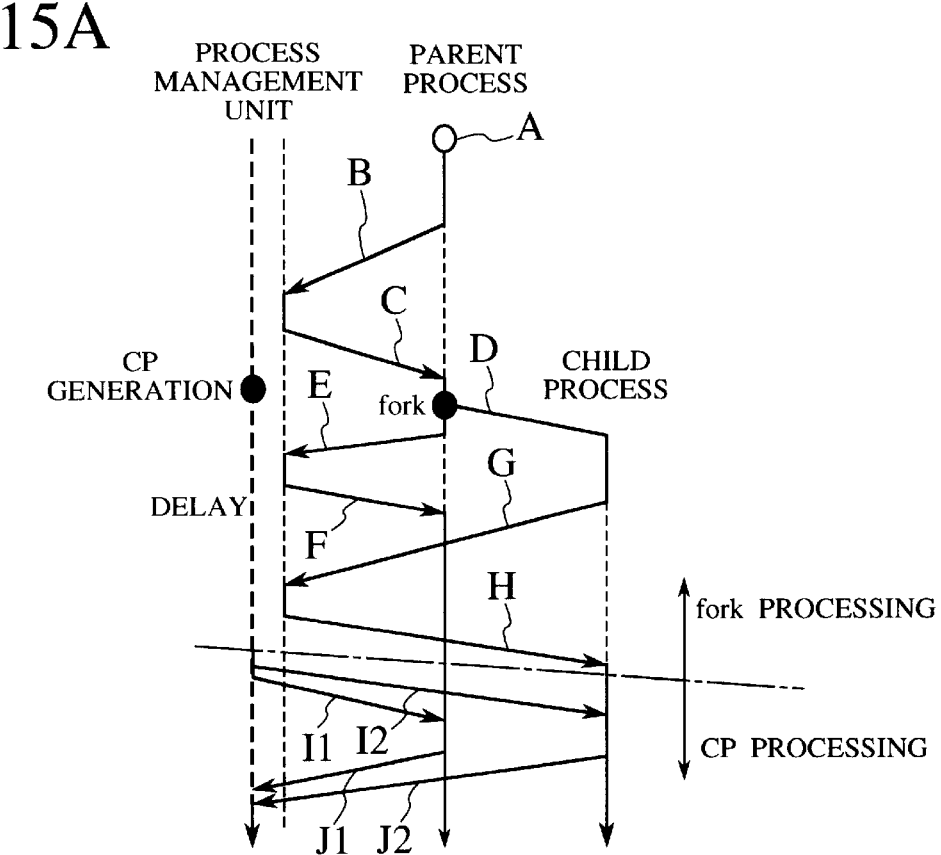
FIGS. 15A and 15B are diagrams showing exemplary processing in the process state management method according to the present invention.
Figure 15B:
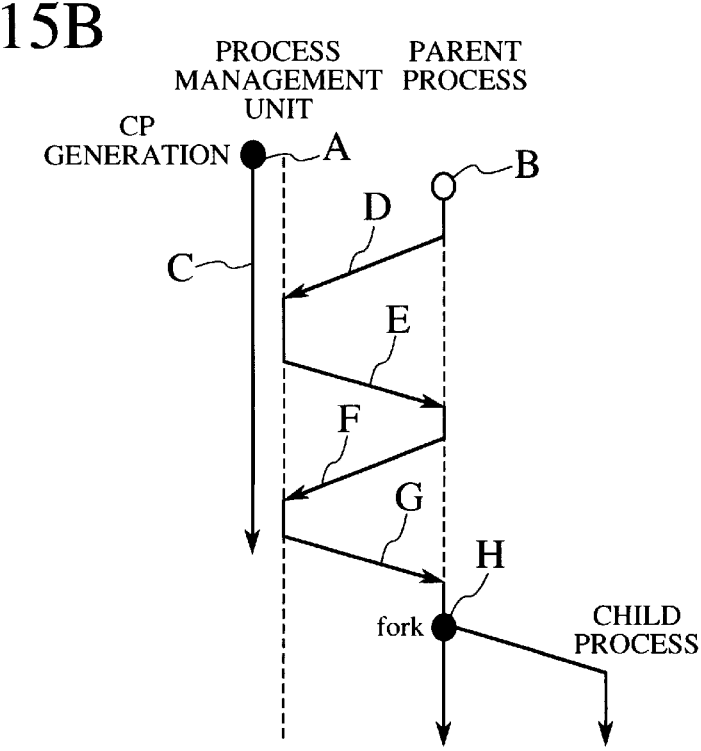

FIGS. 15A and 15B show exemplary processing in the process state management method according to the present invention. FIG. 15A shows a case where the process generation request occurs first and then the acquisition of the process state at the checkpoint takes place subsequently, while FIG. 15B shows a case where the acquisition of the process state at the checkpoint takes place first and then the process generation request occurs subsequently.

In a case of FIG. 15A, when the fork processing is started, the generation of the process state at the checkpoint (CP) notified from the checkpoint timing determination unit 85 is delayed until that fork processing is completed, by means of the initial notification of the fork information from the parent process. Namely, when a series of processing based on the fork execution is started at the (future) parent process (A of FIG. 15A), the parent process notifies its own process ID to the process management unit 61 (B of FIG. 15B) and waits until a response from the process management unit 61 is received. Then, the process management unit 61 returns a response to the parent process after carrying out appropriate processing (C of FIG. 15A), and the parent process executes the fork system call upon receiving that response (D of FIG. 15A).

After the execution of the fork system call by the parent process, the parent process notifies the process ID of the generated child process to the process management unit 61 (E of FIG. 15A), and then receives a response indicating that this process ID is registered (F of FIG. 15A). On the other hand, the child process notifies its own process ID to the process management unit 61 (G of FIG. 15A), and then receives a response indicating that the fork information field content is cleared (H of FIG. 15A). When this series of processing based on the fork system call is completed, the process management unit 61 commands the acquisition of the process state to each process (I1 and I2 of FIG. 15A), and upon receiving this acquisition command, each process acquires its own process state and then notifies the completion of the process state acquisition to the process management unit 61 (J1 and J2 of FIG. 15A).

In this manner, while a new process is generated, the process state acquisition is delayed until that process generation is completed even when it is judged as a checkpoint for the process state acquisition, so that it becomes possible to realize the consistent process state acquisition according to the distributed checkpoint.

On the other hand, in a case of FIG. 15B, when the checkpoint timing determination unit 85 determines that it is a checkpoint (A of FIG. 15B), the CP flag is turned ON (C of FIG. 15B). Then, suppose that the process generation request occurs after that (B of FIG. 15B). In that case, even when the parent process notifies its own process ID (D of FIG. 15B), the process state acquisition command is notified from the process management unit 61 (E of FIG. 15B) and a response indicating that this process ID is registered is returned from the process management unit 61 (G of FIG. 15B) only after a notice indicating that a series of processing at the checkpoint is completed is sent to the process management unit 61 (F of FIG. 15B). Then, after the response indicating that this process ID is registered is returned (G of FIG. 15B), the fork system call is executed and the child process is generated (H of FIG. 15B).

In this manner, the generation of a new process is delayed during the acquisition of the process state according to the checkpoint, until a series of processing based on the checkpoint is completed, so that it becomes possible to realize the consistent process state acquisition according to the distributed checkpoint, even in a case of generating a new process.

Figure 16:
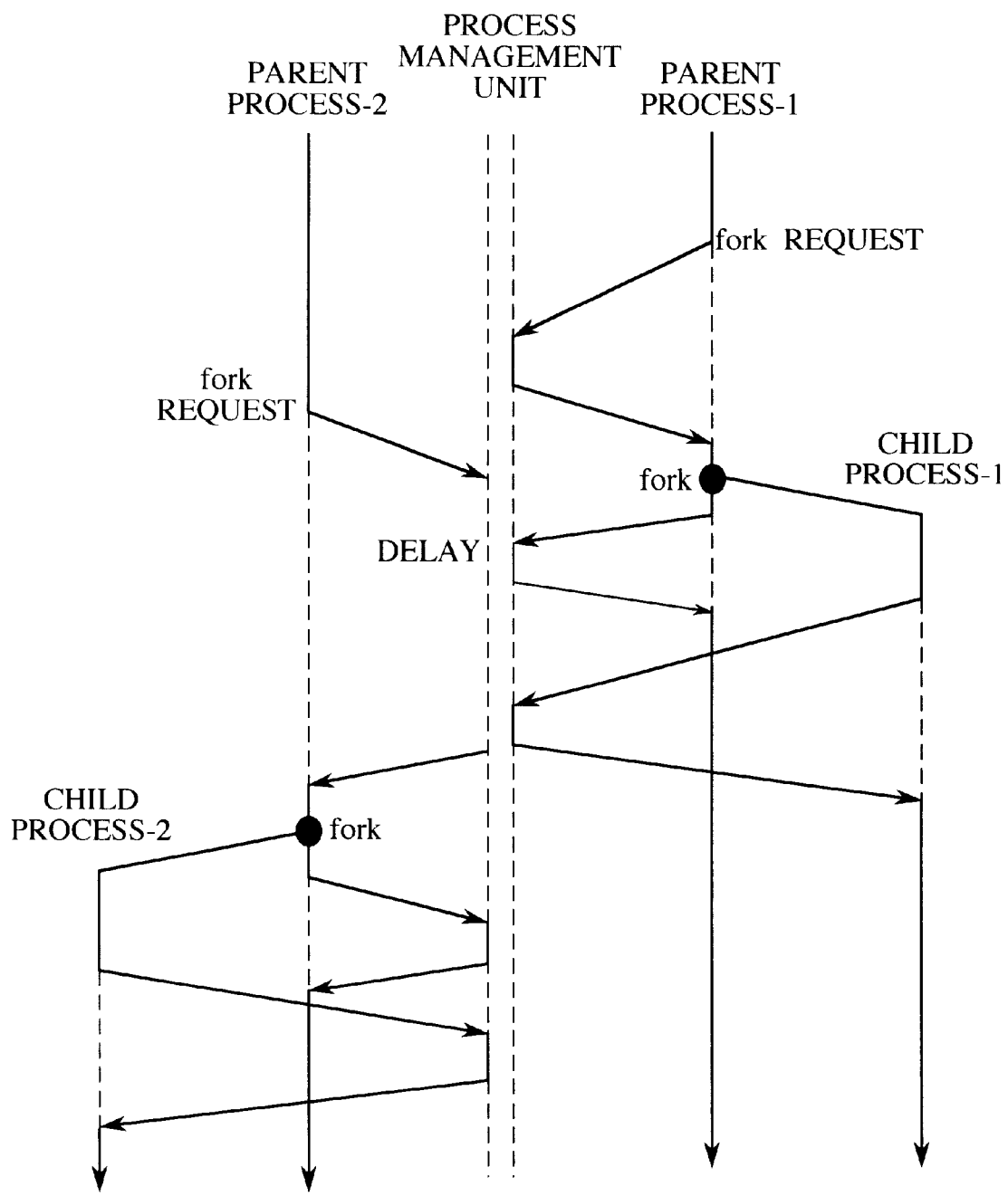
FIG. 16 is a diagram showing another exemplary processing to which the process state management method according to the present invention is applicable.

Note that the present invention is equally capable of realizing the consistent process state acquisition even in a case where the parent process generates another process and that another process further generates a child process. Note also that the present invention is equally capable of realizing the consistent process state acquisition even in a case where more than one parent processes try to generate child processes at the same time, as indicated in FIG. 16.

As described, according to the present invention, it becomes possible to realize the process state acquisition based on the synchronous checkpointing method, which is capable of acquiring (generating and storing) process states consistently according to the distributed checkpoints, even in a case where a new process is generated from some process.

It is also to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the functional system configuration in the above described configuration of FIG. 8 can be conveniently implemented in a form of a software package which is to be mounted onto each computer conestituting the system.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for managing process states by acquiring process states of a group of processes which are mutually related, comprising the steps of:

(a) prohibiting a new process generation during a process state acquisition, by judging whether or not a process generation request by a first process for generating a second process is prior to a process state acquisition request, and generating the second process from the first process in response to the process generation request when the process generation request is judged to be prior to the process state acquisition request, or after a process state acquisition is completed in response to the process state acquisition request when the process state acquisition request is judged to be prior to the process generation request; and (b) prohibiting the process state acquisition during the new process generation.

2. The method of claim 1, wherein the generating step also judges whether or not another process is being generated by a process mutually related with the first process, when the process generation request is received, and generates the second process from the first process when the another process is judged to not be generated.

3. The method of claim 1, wherein the step (b) includes the steps of:

notifying from the first process an identifier of the second process and notifying from the second process the identifier of the second process, when the second process is generated from the first process; and acquiring a process state at each of the first and second processes after a notice of the identifier of the second process from the first process is received, when a notice of the identifier of the second process from the second process is prior to the notice from the first process.

4. A method for managing process states by acquiring process states of a group of processes which are mutually related, comprising the steps of:

notifying from a first process an identifier of a second process and notifying from the second process the identifier of the second process, when the second process is generated from the first process;

judging whether or not a notice of the identifier of the second process from the second process is prior to a notice of the identifier of the second process from the first process;

returning a prescribed response to the notice from the second process after the notice from the first process is received, when the notice from the second process is judged to be prior to the notice from the first process; and commanding process state acquisition to each of the first and second processes according to checkpoints after the prescribed response is returned to the second process.

5. The method of claim 4, further comprising the step of:

acquiring the process state at each of the first and second processes according to checkpoints when process state acquisition is commanded at each of the first and second processes.

6. The method of claim 4, further comprising the steps of:

judging whether or not another process is being generated by a process mutually related with the first process, before said notifying step; and generating the second process from the first process when the another process is judged to not be generated.

7. The method of claim 4, further comprising the steps of:

judging whether or not a process generation request by the first process for generating the second process is prior to a process state acquisition request or not;

generating the second process from the first process in response to the process generation request when the process generation request is judged to be prior to the process state acquisition request, or after a process state acquisition in response to the process state acquisition request is completed when the process state acquisition request is judged to be prior to the process generation request.

8. A method for managing process states by acquiring process states of a group of processes which are mutually related, comprising the steps of:

judging whether or not a process generation request by a first process for generating a second process is prior to a process state acquisition request;

generating the second process from the first process in response to the process generation request when the process generation request is judged to be prior to the process state acquisition request, or after a process state acquisition in response to the process state acquisition request is completed when the process state acquisition request is judged to be prior to the process generation request;

notifying from the first process an identifier of the second process and notifying from the second process the identifier of the second process, when the second process is generated from the first process; and acquiring a process state at each of the first and second processes after a notice of the identifier of the second process from the first process is received, when a notice of the identifier of the second process from the second process is prior to the notice from the first process.

9. A system for managing process states by acquiring process states of a group of processes which are mutually related, comprising:

a first unit configured to detect whether or not a process generation request by a first process for generating a second process is issued;

a second unit configured to judge whether or not another process is being generated by a process mutually related with the first process when the process generation request by the first process is detected by the first unit;

a third unit configured to generate the second process from the first process when the another process is judged to not be generated by the second unit;

a fourth unit configured to notify from the first process an identifier of the second process, when the second process is generated from the first process by the third unit;

a fifth unit configured to notify from the second process the identifier of the second process, when the second process is generated from the first process by the third unit; and a sixth unit configured to acquire process states of the first and second processes according to a notice of the identifier of the second process from the second process notified by the fifth unit and a notice of the identifier of the second process from the first process notified by the fourth unit.

10. An article of manufacture, comprising:

a computer usable medium having a computer readable program code configured to cause a computer to function as a system for managing process states by acquiring process states of a group of processes which are mutually related, the computer readable program code comprising:

a first computer readable program code configured to cause said computer to detect whether or not a process generation request by a first process for generating a second process is issued;

a second computer readable program code configured to cause said computer to judge whether or not another process is being generated by a process mutually related with the first process when the process generation request by the first process is detected by the first computer readable program code;

a third computer readable program code configured to cause said computer to generate the second process from the first process when the another process is judged to not be generated by the second computer readable program code;

a fourth computer readable program code configured to cause said computer to notify from the first process an identifier of the second process, when the second process is generated from the first process by the third computer readable program code;

a fifth computer readable program code configured to cause said computer to notify from the second process the identifier of the second process, when the second process is generated from the first process by the third computer readable program code; and a sixth computer readable program code configured to cause said computer to acquire process states of the first and second processes according to a notice of the identifier of the second process from the second process notified by the fifth computer readable program code and a notice of the identifier of the second process from the first process notified by the fourth computer readable program code.

* * * * *